Patented July 23, 1946

2,404,509

UNITED STATES PATENT OFFICE 2,404,509

HYDANTOINS AND METHODS OF OBTAINING THE SAME

Loren M. Long, Detroit, Mich., assignor to Parke, Davis & Company, Detroit, Mich., a corporation of Michigan No Drawing. Application September 25, 1944, Serial No. 555,758

9 Claims. (Cl. 260—309.5)

The invention relates to a new class of chemical compounds which are valuable for therapeutic use, especially as anticonvulsants having relatively high anticonvulsant activity combined with low toxicity.

The compounds of the invention have the general formula,

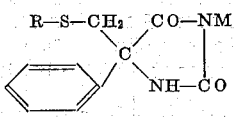

where R is a straight, branched, or cyclic alkyl radical or an aryl or aralkyl radical such that the total number of carbon atoms in R is not more than 7. M of this formula represents a member of the class hydrogen and basic elements or groups forming non-toxic salts of the hydantoins, such as sodium, calcium, magnesium, ammonium and substituted ammonium, for example, mono- and di-alkyl ammonium and corresponding hydroxy alkyl ammonium.

The compounds of the invention can be used orally or by injection. For example, the average adult person can start with a dosage of a few tenths of a gram per day orally and increase the dosage slightly thereafter. The compounds are without odor when properly purified.

The compounds of this invention are readily prepared by reacting the corresponding ketone intermediates of the formula,

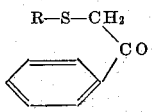

where R has the same significance as in the formula given above for the final products, with an alkaline, water-soluble cyanide and aqueous ammonium carbonate or the like combination consisting of, or capable of generating, ammonia, carbon dioxide, and water, acidifying the reaction mixture, and separating the hydantoin. In spite of the alkaline conditions used, I have found that the sulfide linkage of the intermediate ketones goes through the reaction to give my new hydantoins with substantially no change. The intermediate ketones are, in most cases, prepared by the action of the sodium salt of the appropriate mercaptan on phenacyl chloride (T. C. Whitner, Jr. and E. E. Reid; J. A. C. S. 43, 638 (1921)). They may also be prepared by the reaction of an acid chloride of the formula,

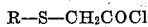

where R has the same significance as in the formula given above for the final product, with benzene in the presence of anhydrous aluminum chloride.

The following examples serve to illustrate the invention:

Preparation of 5-n-butylmercaptomethyl-5-phenylhydantoin.

(a) The following reaction is used for the preparation of the β-n-butylmercaptoacetophenone intermediate,

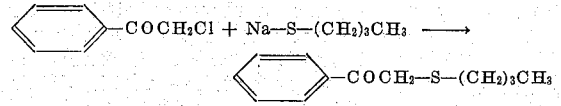

30 grams (0.75 mole) of sodium hydroxide are dissolved in 500 cc. of 50% alcohol. To the cooled solution are added 67.5 grams (0.75 mole) n-butyl mercaptan. The resulting solution is cooled to about 20° C. and 115 grams of phenacyl chloride are added in one portion. The mixture becomes warm and two layers are formed. The mixture is refluxed for 30 minutes followed by evaporation on a steam bath to ½ of the original volume. The residue is diluted with an equal volume of cold water and extracted twice with small volumes of ether. The ether extracts are combined and dried over anhydrous magnesium sulfate or other suitable drying agent. After filtering, the ether solution is evaporated on the steam bath and the residue distilled through a short Vigreaux column at reduced pressure. 139 grams of a colorless liquid boiling at 135° C. at 2 mm. are obtained. $n_{20}{}^D = 1.5513$.

(b) The following reaction represents a second method of preparing the β-n-butylmercaptoacetophenone intermediate,

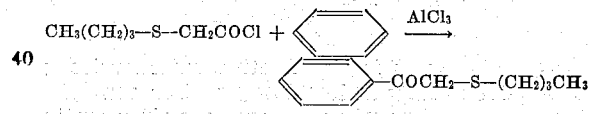

116 grams (0.7 mole) of the acid chloride (prepared by treating the corresponding n-butyl thioether derivative of thioglycolic acid with thionyl chloride) are dissolved in 500 cc. of anhydrous benzene in a 1 liter, 3-necked flask fitted with a stirrer, reflux condenser, and small flask for adding anhydrous aluminum chloride. The solution is cooled in an ice bath and 98 grams (0.735 mole) of anhydrous aluminum chloride are added with stirring over a period of 2½ hours. When all of the aluminum chloride has been added, the flask is placed in a water bath at 50° C. and warmed for a few minutes. The reaction product is a dark-colored liquid which is poured slowly with stirring into a beaker of chipped ice. The water layer is separated from the benzene layer and extracted with 100 cc. of benzene. The benzene solutions are then combined, washed twice with a saturated sodium chloride solution, and distilled. The first portion of benzene passing over removes any water present. 105 grams of the very light yellow liquid mercapto ketone boiling at 131–132° C. at 1 mm. are obtained. $n_{20}{}^{D}=1.5513$.

(c) The following reaction is used in the preparation of 5-n-butylmercaptomethyl-5-phenylhydantoin,

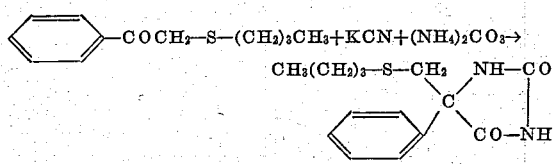

93 grams (0.45 mole) of the β-n-butylmercaptoacetophenone are added to 1 liter of 70% alcohol in a 2 liter flask fitted with a large bore air condenser. 32.5 grams (0.5 mole) of potassium cyanide and 100 grams of ammonium carbonate in the form of small lumps are added (hood!). The mixture is stirred vigorously for a few minutes followed by heating in a water bath at 55–60° C. for about 12 hours. The mixture is then evaporated on a steam bath to about a third of the original volume, cooled, and acidified with dilute hydrochloric acid (hood!). The hydantoin precipitates as an oil which solidifies within a few minutes. The solid material is filtered off and washed with water. The product may be purified by dissolving it in dilute sodium hydroxide, extracting impurities with ether, filtering the extracted aqueous solution and reprecipitating wtih an acid. The hydantoin may be recrystallized from alcohol and water. 5-n-butylmercaptomethyl - 5 - phenylhydantoin melts at 116° C. Yields are about 80%.

(d) Preparation of a salt of 5-n-butylmercaptomethyl-5-phenylhydantoin.

A quantity of the hydantoin prepared in example (c) is dissolved in a solution consisting of one equivalent of sodium hydroxide and enough water to make a 5% solution. The solution is treated with a small amount of charcoal, filtered, and the filtrate evaporated to dryness under reduced pressure at 55° C. The dry, solid product is the sodium salt of 5-n-butylmercaptomethyl-5-phenylhydantoin of the formula,

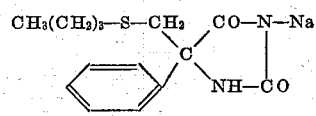

This sodium salt is an effective anticonvulsant when given orally at low dosages. For example, it has a 4+ rating when 60 mgm. are given orally to cats.

Other compounds of my invention may be prepared by the same methods illustrated above and using as starting materials, instead of n-butyl mercaptan, other mercaptans, such as heptyl mercaptan or, in general, mercaptans of formula, R—S—H, where R may be a straight, branched, or cyclic alkyl radical or an aryl or aralkyl radical such that the total number of carbon atoms in R is not more than 7.

Further examples of my new hydantoins which I have prepared by methods such as described above for the 5-n-butylmercaptomethyl compound are the following, wherein R stands for the radical R of the general formula,

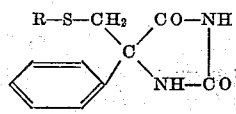

| R | Melting point, °C. |
|---|---|
| Methyl | 164 |
| Ethyl | 196 |
| n-Propyl | 142 |
| Isopropyl | 151.5 |
| n-Butyl | 116 |
| Isobutyl | 147 |
| n-Amyl | 107 |
| n-Hexyl | 114.5 |
| Cyclohexyl | 179.5 |
| Phenyl | 215 |
| Benzyl | 174 |

Other compounds of my invention may be similarly prepared having alkyl radicals such as secondary-butyl, 1-methylbutyl, 1-methylamyl, 1-ethylamyl, or 1-methylhexyl as the substituent represented by R in the general formula. I prefer the straight chain alkyl derivatives.

The above described 5-n-amylmercaptomethyl-5-phenylhydantoin of melting point 107° C. can be converted to its sodium salt and administered as an anticonvulsant which also is effective as a hypnotic.

The sodium salts of the above listed hydantoins are prepared by reacting the hydantoin with sodium hydroxide as set forth in example (d). Other salts are prepared by using, instead of sodium hydroxide, ammonium hydroxide or an amine to obtain the corresponding salts indicated in the general formula under the symbol M.

The compounds of my invention, either in the form of the hydantoins or their salts, may be administered orally or parenterally, as by injection. They can be suspended or dissolved in inert carrier liquids such as in aqueous solution or in suspension in animal or vegetable oils or fats before administration.

What I claim as my invention is:

1. A compound having the formula,

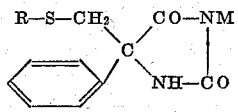

where R is a member of the class alkyl, cycloalkyl, aryl, and aralkyl radicals having not more than 7 carbon atoms, and M is a member of the group consisting of hydrogen and non-toxic salt-forming groups.

2. A compound having the formula,

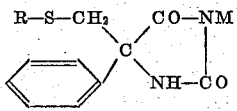

where R is an alkyl radical having not more than 7 carbon atoms and M is a member of the group consisting of hydrogen and non-toxic salt-forming groups.

3. A compound having the formula,

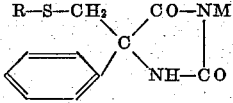

where R is a straight chain alkyl radical having not more than 7 carbon atoms and M is a member of the group consisting of hydrogen and non-toxic salt-forming groups.

4. 5 - n - butylmercaptomethyl-5-phenylhydantoin.

5. The sodium salt of 5-n-butylmercaptomethyl-5-phenylhydantoin.

6. 5 - n - amylmercaptomethyl-5-phenylhydantoin.

7. Process for obtaining hydantoin compounds comprising reacting a ketone of formula,

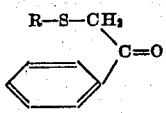

where R is a member of the class alkyl, cycloalkyl, aryl and aralkyl radicals having not more than 7 carbon atoms, with a water soluble cyanide in the presence of the system ammonia, water and carbon dioxide.

8. Process for obtaining hydantoin compounds comprising reacting a ketone of formula,

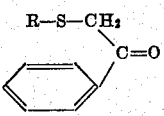

where R is a straight chain alkyl radical having not more than 7 carbon atoms, with a water-soluble cyanide in the presence of the system, ammonia, water and carbon dioxide.

9. Process for obtaining hydantoin compounds comprising reacting β-n-butylmercaptoacetophenone with a water-soluble cyanide in the presence of the system ammonia, water and carbon dioxide.

LOREN M. LONG.